F. CURRAN.
LOCOMOTIVE AND CAR WHEEL GAGE.
APPLICATION FILED APR. 10, 1919.
1,347,684.
Patented July 27, 1920.
2 SHEETS—SHEET 1.
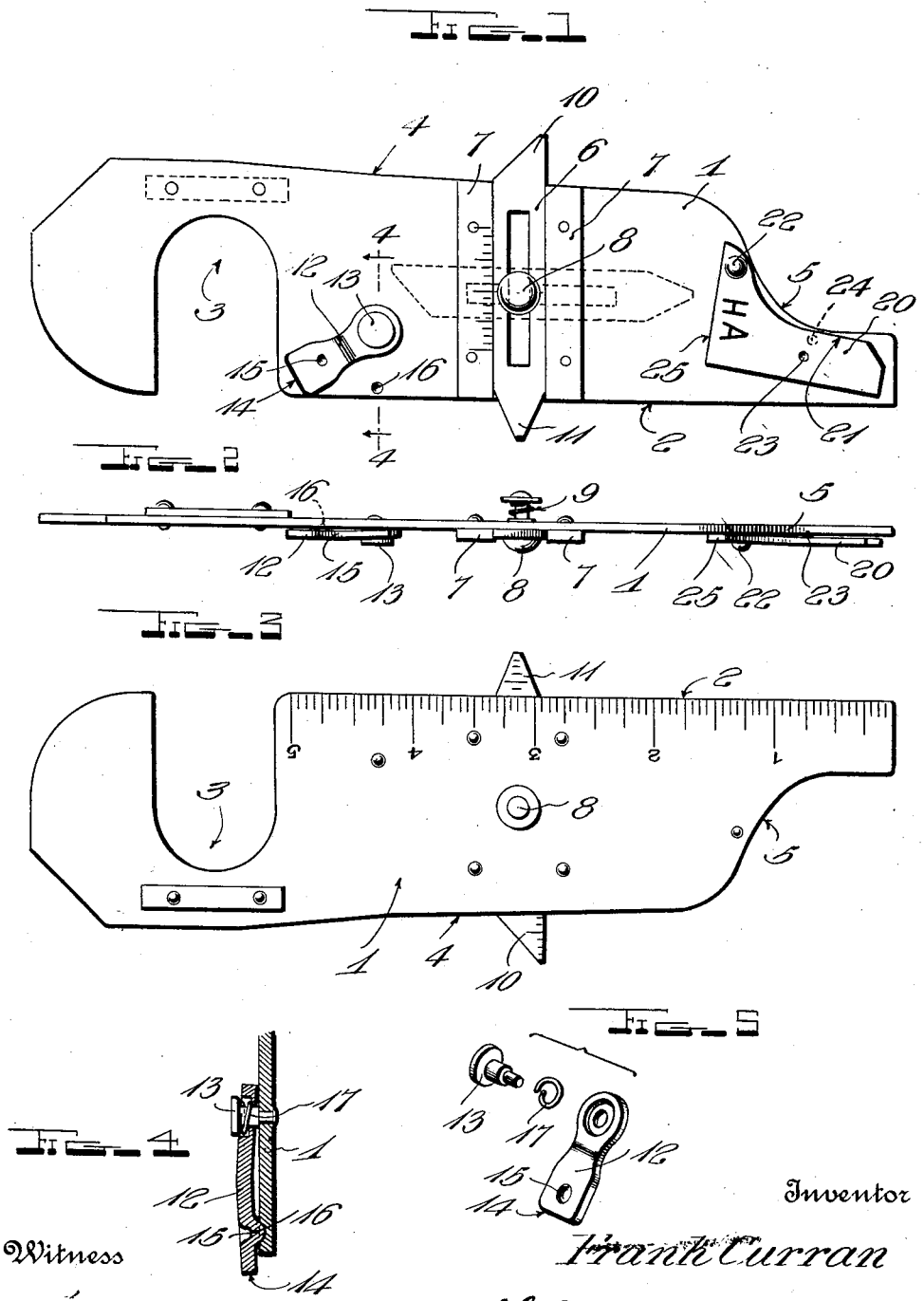
Witness
Inventor
Frank Curran
By H. B. Willson & Co.
Attorneys

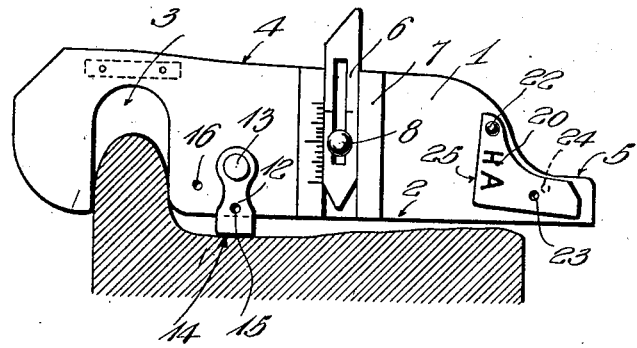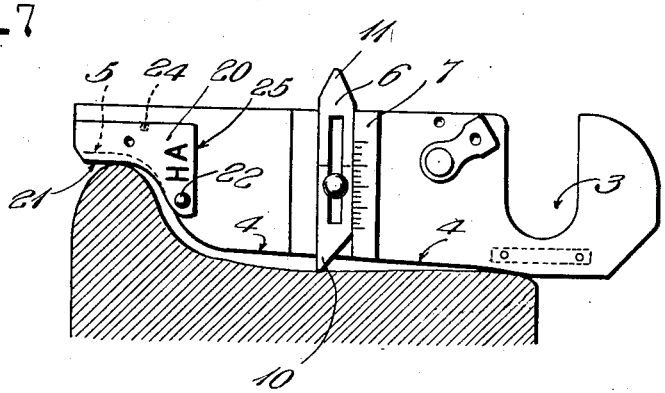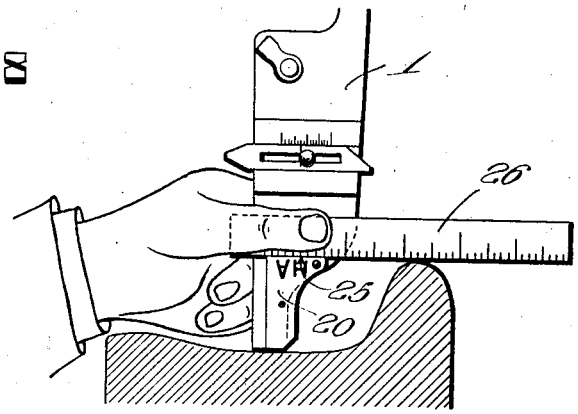

UNITED STATES PATENT OFFICE.

FRANK CURRAN, OF SUSQUEHANNA, PENNSYLVANIA.

LOCOMOTIVE AND CAR WHEEL GAGE.

1,347,684.　　　　Specification of Letters Patent.　　Patented July 27, 1920.

Application filed April 10, 1919. Serial No. 289,022.

*To all whom it may concern:*

Be it known that I, FRANK CURRAN, citizen of the United States, residing at Susquehanna, in the county of Susquehanna and State of Pennsylvania, have invented certain new and useful Improvements in Locomotive and Car Wheel Gages; and I do declare the following to be a full, clear, and exact description of the invention, such as will enable others skilled in the art to which it appertains to make and use the same.

My invention has for one object to provide a locomotive and car wheel gage having all of the advantages of, and other advantages not possessed by the devices shown in United States Patents No. 440621, issued Nov. 18, 1890 to Peter Curran, and 752,526, patented Feb. 16th, 1904 by myself; and in carrying out this end, other objects are to provide an extensible and retractible indicator which will insure gaging of worn flanges at the prescribed distance from the tread, and to allow accurate tread gaging whether the flange be either one inch or one and one-eighth inches high, these being the two heights universally used.

With the foregoing in view, the invention resides in the novel features of construction hereinafter described and claimed, reference being made to the accompanying drawings.

Figure 1 is an elevation of the obverse side of the gage.

Fig. 2 is an edge view.

Fig. 3 is an elevation of the reverse side of the gage.

Fig. 4 is an enlarged detail section on the plane indicated by the line 4—4 of Fig. 1, with the indicating arm swung downwardly.

Fig. 5 is a perspective view of the indicating arm, and its pivot and spring.

Fig. 6 is a side elevation of the device used for gaging the thickness of a wheel flange.

Fig. 7 is an elevation disclosing the manner in which tread wear and depth of shell spots, slide spots and the like may be gaged.

Fig. 8 discloses the manner of gaging excessive tread wear.

In the drawings above briefly described, the numeral 1 designates an elongated plate having a straight edge 2 provided near one end with a notch 3 of insufficient width to fully receive a wheel flange of prescribed width which is not dangerously worn. The opposite edge 4 of the plate 1 is shaped for contact with an unworn tread of a wheel of prescribed dimensions and one end of said edge 4 is offset inwardly at 5 on a compound curve corresponding to the contour of the rail engaging side of an unworn flange of such a wheel. A slide 6 is mounted for movement transversely of the plate 1 between suitable guides 7 and is held in adjusted position by a rivet 8 held tightly against said slide by a coil spring 9. This mounting of the slide is a slight simplification of the patents above referred to but the results obtained are the same. Another departure which is preferably made is to point one end of the slide 6 by the provision of a single diagonal cut 10. This end of the slide is used in gaging the amount of tread wear, the depth of shell holes, (holes caused by inferior metal or casting) slide spots, (spots worn on the tread by sliding of the wheel on the track) and the like, and due to the bevel 10, the active point of the slide is located at approximately the center of the tread, at which point the measurement should be taken (see Fig. 7). The other end of the slide 6 is pointed at 11 and may be used in any of the ways now well known to the trade, and when the slide is not in use it may be swung to a position longitudinally of the plate 1 as seen in dotted lines in Fig. 1.

In gaging worn flanges, it is necessary that the measurement shall be taken at a prescribed point spaced outwardly from the tread of the wheel, and in order that this may be done without interfering with the use of the straight edge 2 for other purposes, I provide a projectable and retractible indicator 12. This indicator is preferably in the form of an arm pivoted to the plate 1 by a rivet or the like 13, so that it may be swung inwardly to the position of Fig. 1 when not in use, and may be projected as in Fig. 6 when its use is required. When the gage is applied so that the worn flange is received in the notch 3, if said flange is worn to a condemning extent, the outer end 14 of the arm 12 will strike the tread of the wheel. It is thus indicated immediately that the flange is dangerously worn and that the wheel should be condemned. (See Fig. 6.)

For arresting the inward and outward movement of the arm 12 and holding it in either position, I provide a stud 15 on said arm and spaced sockets 16 in the plate 1, together with a spring 17 on the rivet 13 to force the arm 12 inwardly and thus engage said stud with the sockets. For ease of manufacture, the stud 15 is preferably formed by stamping a part of the arm 12 laterally. By the provision of the spring 17, the stud 15, and the sockets 16, when the arm 12 is swung outwardly for use, its movement will be arrested at its only proper position and said arm will be held in this position until released by hand. Furthermore, when the arm is swung inwardly its movement is also arrested and it is held in retracted position against accidental movement. This arrangement of parts thus allows the device to be quickly and easily used since no gage marks or the like are necessary to properly set the arm for use.

The indicator 12 may be mounted as described, or in any other adequate manner for obtaining the required results. This is one feature of improvement over the patented devices above mentioned and by actual use, the trade has found this to be an important advance. The other improvement is described below.

In gaging tread wear, depth of shell spots, etc., on the wheels having flanges one and one-eighth inches high, the offset end 5 of the edge 4 rests on the periphery of the flange and the other end of said edge 4 rests on the outer peripheral edge portion of the tread. Neither of these parts receive any noticeable amount of wear and thus when the slide 6 is projected as seen in Fig. 7, the gaging will be accurately done. It is to be taken into consideration that the flanges of some wheels are only one inch high and in order that the device may be effectively used on these wheels also, I provide a projectable and retractible flange engaging member 20 having an edge 21 which is adapted to project an eighth of an inch beyond the edge 5 for contact with the wheel flange as disclosed in Fig. 7. The slide 6 may then be used as before to gage tread wear, etc. The member 20 is preferably of the L-shape shown and is pivoted at 22 to the plate 1, and in order that said member may be arrested in either inward or outward movement and then held in either position, I provide a stud 23 and sockets 24, the former being adapted to snap into the latter. Due to the shape of the member 20, however, and the location of the stud 23, the torsional resiliency of said member will engage the stud and sockets without the necessity of using a spring on the pivot. I preferably stamp "H A" on the member 20 to indicate height adjustment for flanges of different heights.

Whenever the tread of a wheel is worn to such an extent that said tread is spaced inwardly one and one-half inches or more from the peripheral edge of the flange, the wheel should be condemned, and in order that the member 20 may be instrumental in showing when this condition exists, said member is one and one-half inches in length, and is provided with a straight edge 25 at right angles to the length of the plate 1. A scale or the like 26 may be held upon the plate 1 with its edge in contact with the straight edge 25 as seen in Fig. 8 and if, when the scale 26 is held horizontally upon the periphery of the flange, the lower end of the member 20 strikes or is spaced from the tread of the wheel, it is immediately known that said tread is excessively worn, placing the wheel in a dangerous condition.

From the foregoing, taken in connection with the accompanying drawings, it will be seen that the improvements which I have made over the previously patented devices, although being simple, and inexpensively manufactured, are important advances in the art, and it is therefore to be understood that the invention is not restricted to the specific structure here shown, since numerous minor changes may well be made within the scope of the invention as claimed. Attention is directed to the fact that the gage is used by applying it from the outside of the wheel, this being of great advantage over other devices which necessitate that the operator reach or crawl under the car or locomotive.

I claim:

1. In a locomotive and car wheel gage, a plate having in one edge a notch of a width insufficient to fully receive a wheel flange of prescribed width which is not dangerously worn, and an indicator mounted on said plate adjacent said notch and projectable to a single operative position with its outer end spaced from said plate edge a predetermined distance, said indicator being adapted to strike the wheel tread if the flange is worn to a condemning degree at a prescribed distance from the tread.

2. In a locomotive and car wheel gage, a plate having in one edge a notch of a width insufficient to fully receive a wheel flange of prescribed width which is not dangerously worn, an indicating arm pivoted to said plate adjacent said notch and projectable to a single operative position with its free end spaced from said plate edge a predetermined distance, said arm being adapted to strike the wheel tread if the flange is worn to a condemning degree at a prescribed distance from the tread, a stud on said arm, and a spring on the pivot of said arm for forcing the latter tightly against the plate, said plate having a pair of spaced sockets to receive said stud and arrest and hold the arm when moved to either projected or retracted position.

3. In a locomotive and car wheel gage, a plate having an edge adapted to rest at one end on the outer edge portion of a wheel tread, the other end of said edge being offset inwardly for contact with the periphery of a wheel flange of prescribed height, a gage mounted on said plate between the ends of the latter and projectable from said edge thereof to show the amount of tread wear, a projectable flange engaging member mounted on said plate and means for limiting the projection of said member to a single operative position with its edge spaced a predetermined distance from said offset end of the plate edge for contact with the periphery of a relatively narrow flange.

4. A structure as specified in claim 3, said flange engaging member having a straight edge at right angles to the aforesaid plate edge and spaced from the adjacent plate end a distance approximately equal to the height of the flange on an excessively worn wheel of prescribed dimensions, whereby a blade may be held against said straight edge to gage extreme tread wear.

5. A wheel gage comprising an elongated plate having near one end of one longitudinal edge a notch to receive a wheel flange, and having the other end of its opposite edge offset inwardly to rest on a wheel flange, and a gage member mounted on said plate to slide transversely thereof and project beyond either of the aforesaid edges; said gage member consisting of a flat strip of metal pointed at one end by two bevels meeting at the center of the strip and pointed at its other end by a single bevel extending from one edge of the strip to the other.

In testimony whereof I have hereunto set my hand.

FRANK CURRAN.